Sept. 16, 1930.                L. A. LEWIS                1,776,189
                                 METER
                            Filed Jan. 17, 1929
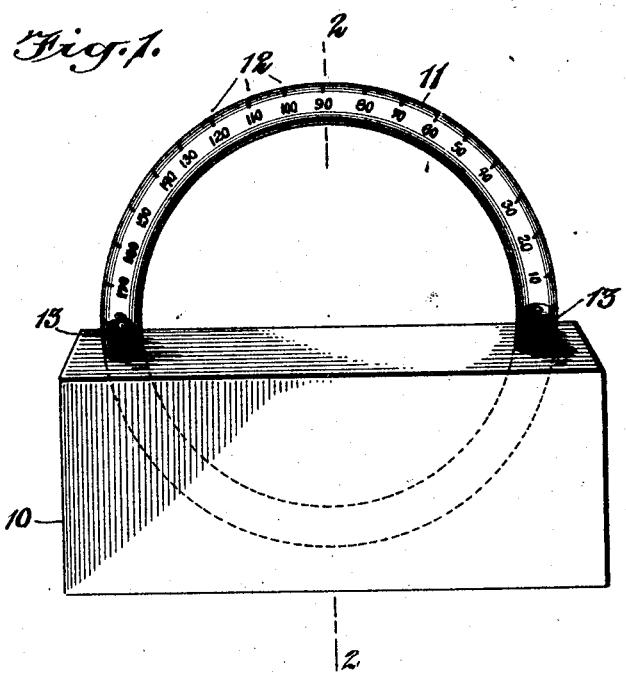
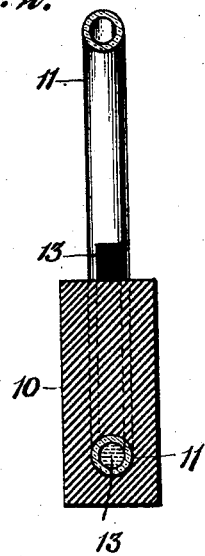 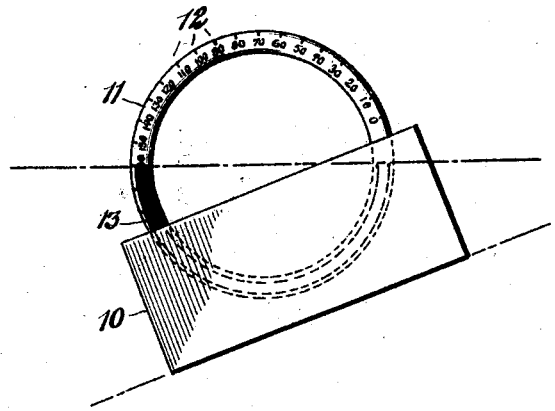
WITNESSES
INVENTOR
Lester A. Lewis
BY
ATTORNEYS Patented Sept. 16, 1930

1,776,189

UNITED STATES PATENT OFFICE

LESTER A. LEWIS, OF BEACON, NEW YORK

METER

Application filed January 17, 1929. Serial No. 333,124.

This invention relates to meters.

It is among the objects of the present invention to provide a novel and improved inclinometer especially adapted to conveniently indicate the keel angle of the structure upon which it is mounted.

Another object of the present invention is to provide a device of the character set forth in which a direct optical reading of the angular position of a vehicle may be conveniently had.

A further object of the present invention is to provide a device of the character set forth, which, if desired, may be readily arranged for the control of an electrical circuit in response to predetermined inclination of the structure upon which it is mounted.

Other objects of the present invention include the combination and interrelation of parts whereby the whole forms a simple and efficient apparatus well suited to the demands of economic manufacture.

Numerous other objects and features of the present invention will be apparent from a consideration of the following specification taken in connection with the accompanying drawings, in which Figure 1 is a perspective view of one form of the present invention;

Fig. 2 is a sectional view taken on the lines 2—2 of Fig. 1;

Fig. 3 is a side elevation of that form of the invention shown in Fig. 1, shown in angular position.

Referring more particularly to the drawings, the invention includes a base 10, which is preferably formed of sponge rubber and within which the indicating tube, as will be hereinafter described, is embedded. The tube may be secured and embedded in the base 10 in any desire manner. For instance, the tube may be inserted during the manufacture of the base, or if preferred the tube may be secured in an opening in the base by cement, or by any other means. It will be understood that the base 10 may be formed of any desired material, the sponge rubber above referred to being preferable in that it provides the maximum of cushioning against vibration, and thus protect the indicating tube so that vibrations which would effect inaccuracies in the reading, will not be transmitted thereto. The base 10 is preferably rectangular in configuration as illustrated, and may be arranged for association with a vehicle in any desired manner.

Within the base 10, an indicating tube 11 is provided, preferably ring-shaped and round in cross section. The tube 11 is preferably formed of transparent material, such as glass, the lower portion of the tube 11 being embedded within the base 10, the embedded portion being preferably less than one-half the tube so that the indicating material therein will at all times be visible within the extending portion thereof. It will be understood, however, that the tube 11 may be formed of any desired transparent material and that the cross-section may be of other configuration than the round cross-section illustrated. The tube 11 is hollow to provide an internal annular hollow chamber extending both within and without the base 10.

For indicating the measure of the inclination of the vehicle upon which the base 10 is mounted, the upper half of the tube 11 is provided with indicia 12, preferably divided into degrees, the median portion on one side being marked "0" while the opposite median portion is marked "180", the intermediate indicia being sub-divided therebetween. It will be readily understood that the indicia may be etched upon the surface of the tube 11 or in any other desired manner of affixing the indicia to the tube may be utilized.

For indicating the inclination of the structure, an indicating medium 13 is provided within the tube 11, the arrangement being such that as shown in Fig. 3, departure of the base 10 from the horizontal will effect corresponding rises and falls of the medium 13 in the opposite sides of the tube. The medium 13 is of such color as to be clearly seen through the tube 11. It will be readily seen that the inclination may be accurately determined by noting the height of the visible portion of the medium 13 within the tube, the level of which medium will be directly readable as degrees of inclination by means of the indicia 12. It will be understood that the medium 13 is preferably a deeply colored, non-voluble and non-freezing substance, which is adapted to flow freely under various temperature conditions.

It will be understood that the present invention may be readily adapted for controlling an electrical signal circuit by the provision of a conducting fluid medium within the tube and suitably arranged electrodes extending within the tube and being arranged for bridgment by the conducting fluid, in such a manner that inclination of the apparatus will complete an electrical circuit through the medium 13 to energize the desired signal.

In the operation of the device, the base 10 is adapted for mounting on any desired structure and is preferably adapted for use in connection with land, water or air vehicles. The setting of the device is such that when the vehicle is in its normal horizontal position, both surfaces of the medium 13 are visible and correspond, respectively, with the "0" and "180" readings of the indicia 12. It will be readily seen that departure from the horizontal, as shown in Fig. 3, will cause the fluid to pass around the tube, whereby one surface will be within the tube 10 while the other surface will be adjacent the indicium which corresponds to the angular inclination of the mounting. It will be understood that a plurality of such devices may be utilized to indicate both the rolling angle and the pitching angle of the vehicle. In such arrangements, the devices will be arranged so that their tubes 11 are in planes disposed at right angles to each other.

Having thus described my invention, it will be apparent that numerous changes and modifications in the structural details, and the full use of equivalents may be resorted to without departing from the spirit or scope of the invention as outlined in the appended claims.

What is claimed is:

1. An inclinometer, comprising a shock-absorbing rectangular base, an annular tubular member mounted in said base and having a portion extending therefrom and bearing indicia, and fluid indicating medium within said tubular member whereby its movements therein will co-operate with said indicia to register the angular position of said base.

2. An inclinometer, including a sponge-rubber base, an annular tubular member positioned within said base, a portion of said tubular member extending therefrom, and fluid medium within said tubular member and filling one half of the same, the extending portion of said tubular member bearing indicia, whereby movement of said fluid within said tubular member in response to movement of said base, will register the angle of inclination of said base.

LESTER A. LEWIS.